US010187752B2

(12) United States Patent
Manepalli et al.

(10) Patent No.: US 10,187,752 B2
(45) Date of Patent: Jan. 22, 2019

(54) UE MOTION ESTIMATE BASED ON CELLULAR PARAMETERS

(71) Applicant: Apple Inc., Cupertino, CA (US)

(72) Inventors: Venkateswara Rao Manepalli, Sunnyvale, CA (US); Vijay Kumar Ramamurthi, Milpitas, CA (US); Jianxiong Shi, Dublin, CA (US); Madhusudan Chaudhary, Campbell, CA (US); Srinivasan Nimmala, San Jose, CA (US); Srinivas Burugupalli, Union City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/596,592

(22) Filed: May 16, 2017

(65) Prior Publication Data

US 2018/0338222 A1 Nov. 22, 2018

(51) Int. Cl.
*H04W 36/00* (2009.01)
*H04W 4/02* (2018.01)
*H04W 84/04* (2009.01)
*H04W 88/02* (2009.01)
*H04B 1/3827* (2015.01)

(52) U.S. Cl.
CPC ............. *H04W 4/027* (2013.01); *H04B 1/385* (2013.01); *H04W 84/042* (2013.01); *H04W 88/02* (2013.01)

(58) Field of Classification Search
CPC ..... H04W 8/183; H04W 48/18; H04W 36/30; H04W 36/18; H04W 36/12; H04W 36/04; H04W 16/32; H04W 24/00; H04W 28/04; H04W 72/082

USPC ............. 455/436–453, 456.1–456.3
See application file for complete search history.

(56) References Cited

U.S. PATENT DOCUMENTS

| 5,703,595 | A | * | 12/1997 | Tayloe ............. H04B 1/10 342/175 |
| 6,138,021 | A | * | 10/2000 | Arrington, Jr. .... H04B 7/18541 342/357.52 |
| 6,564,042 | B1 | | 5/2003 | Jou et al. |
| 8,989,789 | B2 | | 3/2015 | Turkka et al. |
| 8,996,011 | B2 | | 3/2015 | Lunden et al. |
| 9,055,474 | B2 | | 6/2015 | Heo et al. |
| 9,179,290 | B2 | | 11/2015 | Wager et al. |
| 9,674,813 | B2 | | 6/2017 | Jeong |
| 2004/0208144 | A1 | | 10/2004 | Vinayakray-Jani |
| 2008/0014881 | A1 | | 1/2008 | Engdahl et al. |

(Continued)

*Primary Examiner* — Dai A Phuong
(74) *Attorney, Agent, or Firm* — Meyertons Hood Kivlin Kowert & Goetzel, P.C.; Jeffrey C. Hood; Brian E. Moore

(57) ABSTRACT

Some embodiments relate to a user equipment device (UE), and associated methods for enabling the UE to estimate velocity of the UE based on cellular parameters. In some embodiments, a first velocity of a UE may be estimated based on a first set of parameters associated with one or more cellular based metrics. Doppler measurements may be performed in response to the first velocity exceeding a velocity threshold for at least a time period. In some embodiments, performing (or conducting) the Doppler measurements may be triggered by (e.g., in response to) the first velocity exceeding the velocity threshold for at least the first time period and receiving an indication from a motion processor of the UE that the UE is in a non-static state. In addition, a second velocity of the UE may be estimated based on the first set of parameters and the Doppler measurements.

20 Claims, 9 Drawing Sheets

(56) References Cited

U.S. PATENT DOCUMENTS

| | | | |
|---|---|---|---|
| 2009/0017803 A1* | 1/2009 | Brillhart | G01C 21/20 |
| | | | 455/414.2 |
| 2009/0322603 A1* | 12/2009 | Liao | G01S 5/0257 |
| | | | 342/357.29 |
| 2010/0159950 A1* | 6/2010 | Toh | H04J 11/0086 |
| | | | 455/456.1 |
| 2010/0216406 A1 | 8/2010 | Park et al. | |
| 2010/0318286 A1* | 12/2010 | Lorkowski | G01S 19/48 |
| | | | 701/119 |
| 2011/0287778 A1 | 11/2011 | Levin et al. | |
| 2013/0095861 A1* | 4/2013 | Li | G01S 5/0263 |
| | | | 455/456.6 |
| 2014/0206382 A1* | 7/2014 | Shabtay | G01S 5/0284 |
| | | | 455/456.1 |
| 2014/0220979 A1 | 8/2014 | Song et al. | |
| 2014/0274009 A1 | 9/2014 | Do et al. | |
| 2015/0257124 A1* | 9/2015 | Karimli | H04W 64/006 |
| | | | 455/436 |
| 2015/0271639 A1 | 9/2015 | Ziskind | |
| 2015/0309184 A1 | 10/2015 | Viscovic | |
| 2015/0312719 A1* | 10/2015 | Cho | H04W 4/027 |
| | | | 455/456.5 |
| 2015/0334626 A1 | 11/2015 | Chen et al. | |
| 2016/0165548 A1* | 6/2016 | Mohlmann | H04B 7/15535 |
| | | | 455/522 |
| 2016/0373994 A1 | 12/2016 | Yiu et al. | |

* cited by examiner

UE MOTION ESTIMATE BASED ON CELLULAR PARAMETERS

FIELD

The present application relates to wireless communication, including providing improved motion estimation base on cellular parameters.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets, which users often carry on their person or hold. In many instances, motion estimation may be used by a mobile electronic device for calorimetry, motion activity alarms, in vehicle reminders, remember vehicle parking location, and so forth. Motion estimation may be based on internal sensor data and/or global positioning data. However, these estimations may have difficulty classifying non-periodic events like cycling, driving, and/or transit detection. In addition, these estimations may not accurately detect a cycling versus a driving scenario. Hence, it would be desirable to provide improved motion estimation capabilities for classifying non-periodic events. Thus, improvements in the field are desirable.

SUMMARY

Embodiments are presented herein of, inter alia, a user equipment device (UE), and associated methods for enabling the UE to estimate velocity of the UE based on cellular parameters. In some embodiments, a first velocity of a UE may be estimated based on a first set of parameters associated with one or more cellular based metrics. Doppler measurements may be performed in response to the first velocity exceeding a velocity threshold for at least a time period. In some embodiments, performing (or conducting) the Doppler measurements may be triggered by (e.g., in response to) the first velocity exceeding the velocity threshold for at least the first time period and receiving an indication from a motion processor of the UE that the UE is in a non-static state. In addition, a second velocity of the UE may be estimated based on the first set of parameters and the Doppler measurements.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
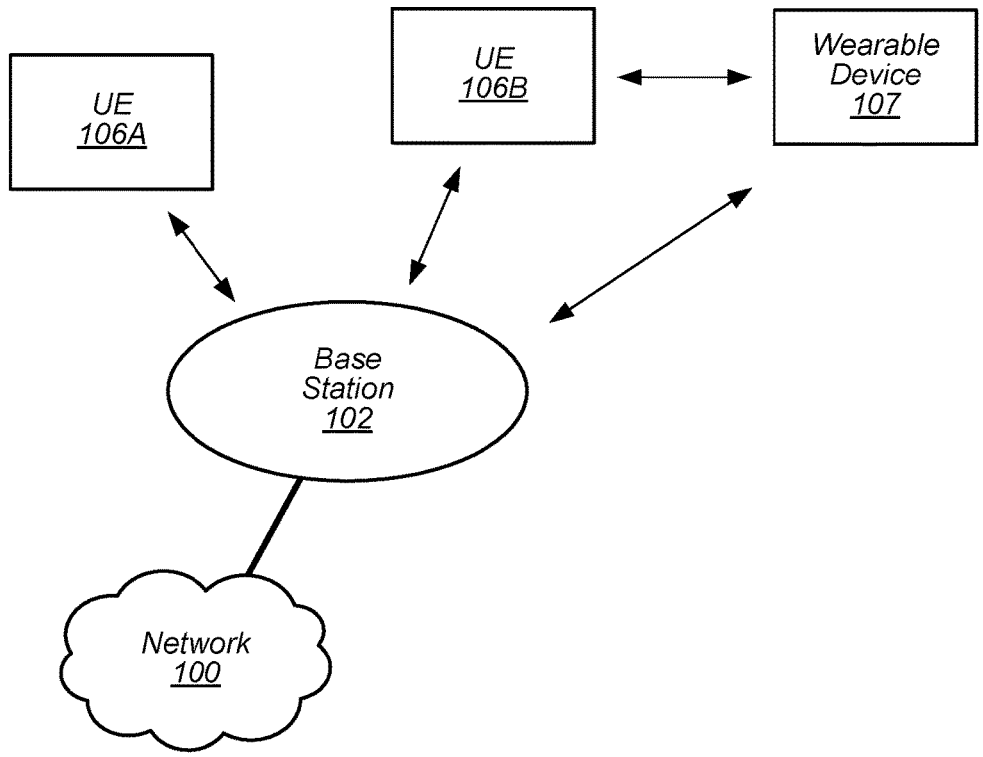
FIG. 1 illustrates an example wireless communication system including a wearable device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as a small form factor device, which as an example may be a wearable device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA). The base station 102 (or similar network infrastructure) may also support other communication technologies, such as text messaging, e.g., SMS (Short Message Service) and similar text messaging technologies, such as iMessage, Facebook Messenger, Whatsapp, etc.

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), 5G-NR, HSPA, 3GPP2 CDMA2000 (e.g., 1×RTT, 1×EV-DO, HRPD, eHRPD), Wi-Fi, WiMAX etc. One example of LTE or LTE-A communications may be VoLTE (Voice over LTE).

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, 5G-NR, WLAN (Wi-Fi), Bluetooth, WiMAX, one or more global navigational satellite systems (GNSS, e.g., GPS or GLONASS), one and/or more mobile television broadcasting standards (e.g., ATSC-M/H), SMS, etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with communication capability, such as cellular communications capability. The UE 106B may be configured to communicate with the UE device 107, which may be referred to as a small form factor device or wearable device 107. The wearable device 107 may be any of various types of devices. Typically a wearable device that has a smaller form factor, and may have limited battery, output power and/or communications abilities relative to UEs 106. As one common example, the UE 106B may be a smart phone carried by a user, and the wearable device 107 may be a smart watch worn by that same user, or possibly a different user. Thus, as another example, in the operation described herein the UE 106B may be a smart phone carried by a first user, and the wearable device 107 may be a smart watch worn by a second, different user. The UE 106B and the wearable device 107 may communicate using any of various short-range communication protocols, such as Bluetooth, Wi-Fi, etc.

The wearable device 107 may include communications capability, e.g., cellular communication capability, and hence may be able to directly communicate with cellular base station 102. However, since the wearable device 107 is possibly limited in one or more of its communication capabilities, output power, and/or battery, the wearable device 107 may in some instances selectively utilize the UE 106B as a proxy for communication purposes with the base station 102 and hence to the network 100. In other words, the wearable device 107 may selectively use the cellular communication capabilities of the UE 106B to conduct its cellular communications. The limitation on communication abilities of the wearable device 107 can be permanent, e.g., due to limitations in output power or the radio access technologies (RATs) supported, or temporary, e.g., due to conditions such as current battery status, inability to access a network, or poor reception.

Figure 2:
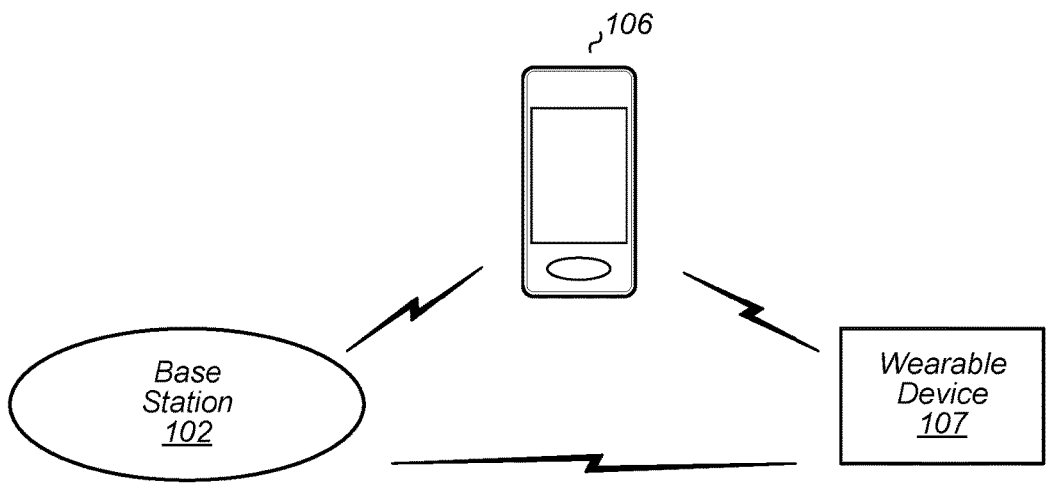
FIG. 2 illustrates an example system in which a wearable device can selectively either directly communicate with a cellular base station or utilize the cellular capabilities of an intermediate or proxy device such as a smart phone, according to some embodiments.

FIG. 2—Example System with a Wearable Device

FIG. 2 illustrates an example small form factor device 107 in communication with base station 102. The small form factor device 107 may be a wearable device such as a smart watch. The wearable device 107 may comprise cellular communication capability and be capable of directly communicating with the base station 102 as shown. When the wearable device 107 is configured to directly communicate with the base station, the wearable device may be said to be in "autonomous mode."

The wearable device 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the wearable device 107 may provide voice/data packets intended for the base station 102 over the short-range link to the UE 106, and the UE 106 may use its cellular functionality to transmit (or relay) this voice/data to the base station on behalf of the wearable device 107. Similarly, the voice/data packets transmitted by the base station and intended for the wearable device 107 may be received by the cellular functionality of the UE 106 and then may be relayed over the short-range link to the wearable device. As noted above, the UE 106 may be a mobile phone, a tablet, or any other type of hand-held device, a media player, a computer, a laptop or virtually any type of wireless device. When the wearable device 107 is configured to indirectly communicate with the base station using the cellular functionality of an intermediate or proxy device, the wearable device 107 may be said to be in "relay mode."

Various embodiments herein are described with respect to the wearable device 107 selectively using either its own cellular functionality (autonomous mode) to communicate with a base station, or using the cellular functionality of the UE 106 (relay mode) for communications, e.g., for 5G-NR, LTE, or VoLTE. However, embodiments described herein may also be used with other radio access technologies (RATs), such as to enable the wearable device 107 to selectively using either its own Wi-Fi functionality (autonomous mode) to communicate with a Wi-Fi access point, or use the Wi-Fi functionality of the UE 106 (relay mode) for Wi-Fi communications.

The wearable device 107 may include a processor that is configured to execute program instructions stored in memory. The wearable device 107 may perform any of the method embodiments described herein by executing such stored instructions. Alternatively, or in addition, the wearable device 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The wearable device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using 5G-NR, LTE (or LTE-Advanced) or Bluetooth, and separate radios for communicating using each of LTE-Advanced and Bluetooth. Other configurations are also possible.

The small form factor device (e.g., wearable device) 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the wearable device 107 is a smart watch or other type of wearable device. When the UE 106 is capable of being used by the wearable device 107 as a proxy, the UE 106 may be referred to as a companion device to the wearable device 107.

Figure 3:
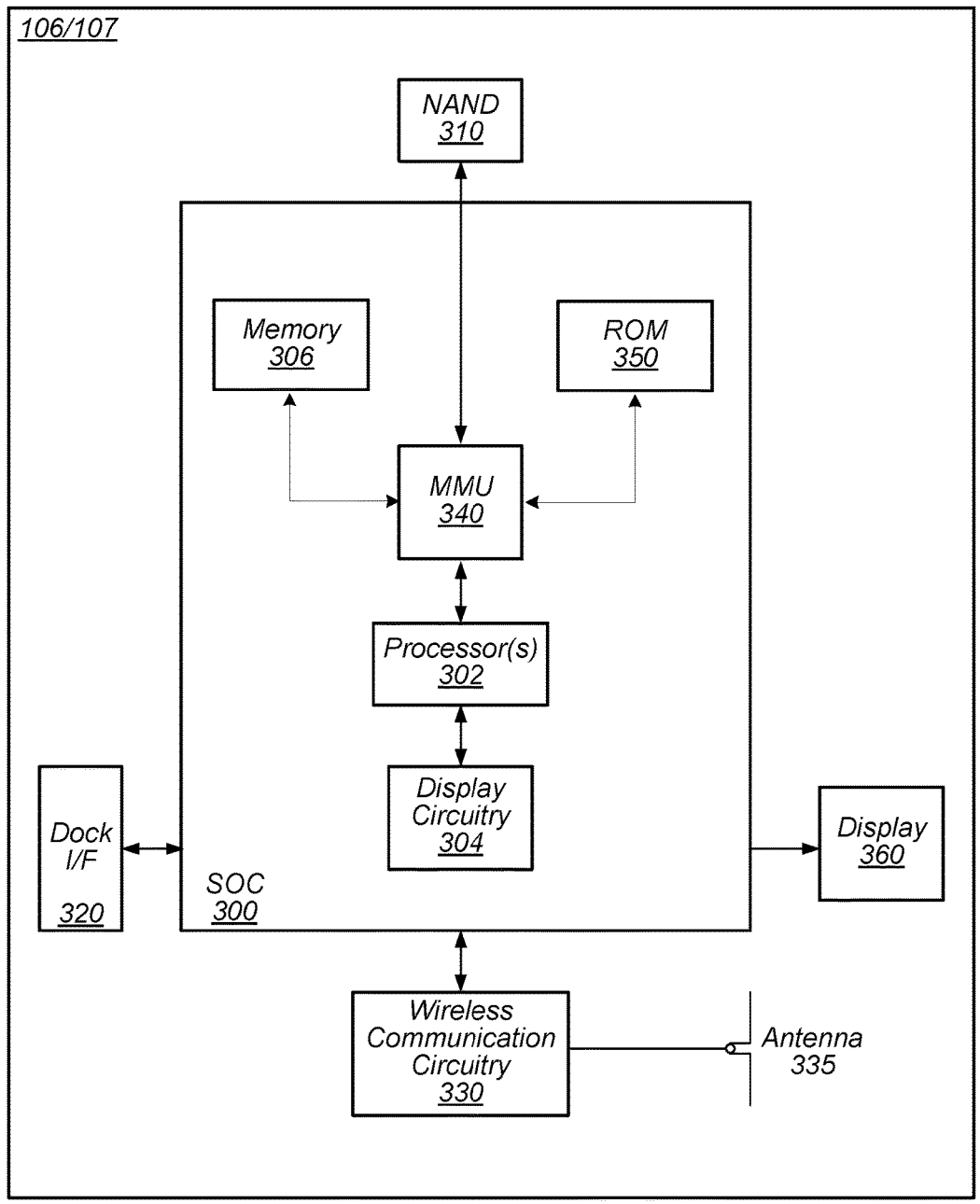
FIG. 3 is a block diagram illustrating an example UE, e.g., a smart phone or wearable device, according to some embodiments.

FIG. 3—Example Block Diagram of a UE Device

FIG. 3 illustrates one possible block diagram of a UE device 106 or a wearable device 107. As shown, the UE 106/107 may include a system on chip (SOC) 300, which may include portions for various purposes. For example, as shown, the SOC 300 may include processor(s) 302 which may execute program instructions for the UE 106/107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The UE device 106/107 may also include other circuits or devices, such as the display circuitry 304, radio 330, connector OF 320, and/or display 360.

In the embodiment shown, ROM 350 may include a bootloader, which may be executed by the processor(s) 302 during bootup or initialization. As also shown, the SOC 300 may be coupled to various other circuits of the UE device 106/107. For example, the UE device 106/107 may include various types of memory, a connector interface 320 (e.g., for coupling to a computer system), the display 360, and wireless communication circuitry (e.g., for communication using 5G-NR, LTE, CDMA2000, Bluetooth, WiFi, NFC, GPS, etc.).

The UE device 106/107 may include at least one antenna, and in some embodiments multiple antennas, for performing wireless communication with base stations and/or other devices. For example, the UE device 106/107 may use antenna 335 to perform the wireless communication. As noted above, the UE 106/107 may in some embodiments be configured to communicate wirelessly using a plurality of wireless communication standards or radio access technologies (RATs).

As described herein, the UE device 106 and/or the wearable device 107 may include hardware and software components for implementing methods according to embodiments of this disclosure. The processor 302 of the UE device 106/107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
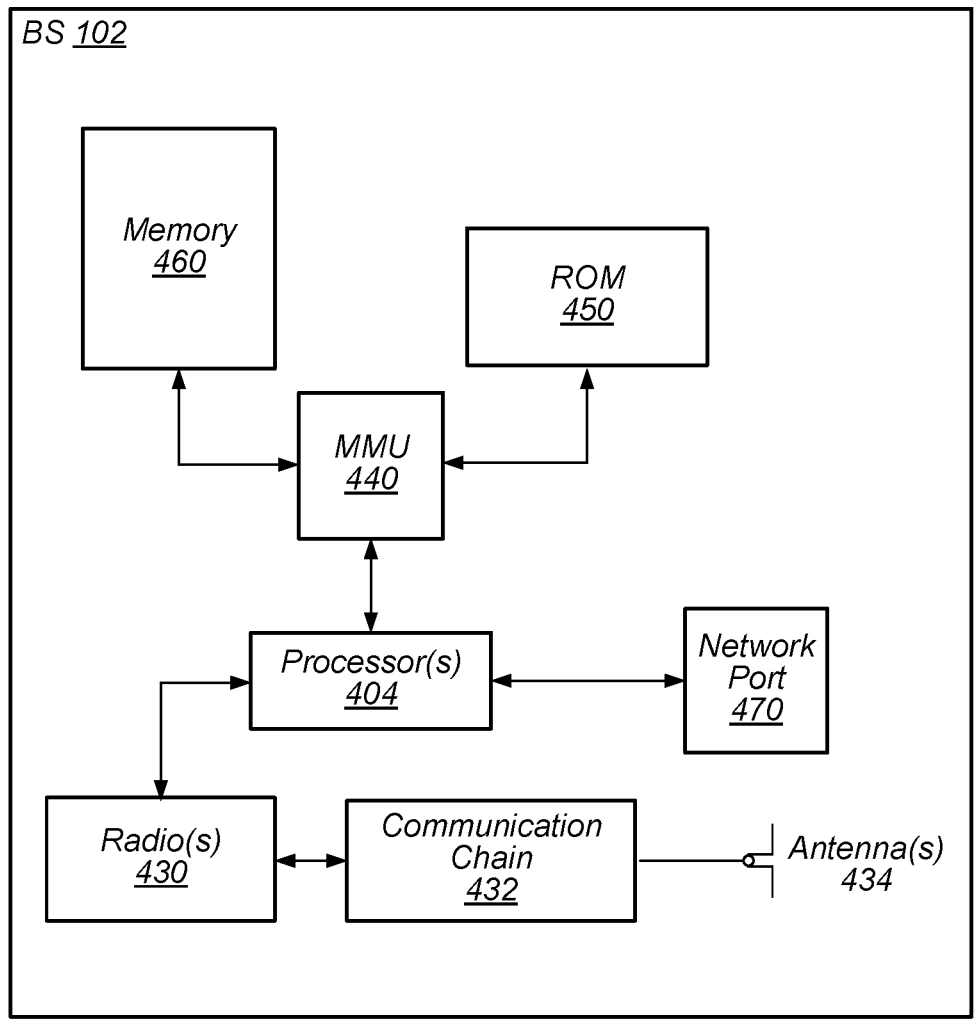
FIG. 4 illustrates an exemplary block diagram of a base station, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, 5G-NR, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein.

UE Motion Estimation

In addition to performing voice calls, UE devices are commonly used for communicating text messages and emails with remote devices. However, there are circumstances where it may be difficult for a user to effectively communicate via text message or email, e.g., the user may be driving such that the user is unable to (or should not) read and respond via text messaging or email. In these circumstances, the user experience may be improved if the UE is configured to enter a text-to-voice or vehicle mode, where the UE may automatically convert an incoming text message or email into audio and/or convert audio input from the user into text that can be sent to the remote device via text message or email while in the vehicle mode.

In some embodiments, the UE (e.g., UE 106/107) may be configured to determine, based on motion estimation via cellular parameters, whether the user is currently driving an automobile, e.g., to determine whether the UE should enable or enter the vehicle mode. For example, if the UE determines that its velocity is above a predetermined threshold, where the predetermined threshold is indicative of a user of the UE driving an automobile, the UE may be configured to automatically enter vehicle mode. In some embodiments, the UE may implement an algorithm that considers (or utilizes) one or more cellular based parameters to determine if the velocity of the UE is above the predetermined threshold (e.g., 10 mph, 15 mph, 20 mph, 25 mph, 30 mph, 45 mph, and so forth). In some embodiments, the algorithm may consider a Doppler based estimation of velocity. In some embodiments, the algorithm may consider a cell change rate or cell change history to estimate velocity. In some embodiments, the algorithm may consider a combination of Doppler and cell change rate/cell change history to estimate velocity.

Further, in some embodiments, the algorithm may first determine whether the UE is stationary, and in response to determining that the UE is not stationary, e.g., via a motion estimation using a first parameter set, the UE may then estimate velocity based on the first parameter set in combination with a second parameter set. For example, in some embodiments, the algorithm may continuously update the first parameter set at a predetermined frequency (e.g., at a predetermined time interval), determine (or estimate) velocity based on the first parameter set, and compare the velocity to a first threshold. The first threshold may be multi-dimensional, e.g., the first threshold may include both a magnitude component and a duration component. Thus, for the velocity to exceed the first threshold, the velocity may be required to exceed a magnitude for a specified duration of time. Upon determining, based on the first parameter set, that the velocity has exceeded the first threshold, the algorithm may trigger measurement of a second parameter set. The second parameter set may aid in improving confidence (e.g., accuracy) of the velocity estimation. In some embodiments, the algorithm may also consider inputs from other motion detection mechanisms prior to triggering measurement of the second parameter set. In other words, the algorithm, in response to the velocity exceeding the first threshold (based on the first parameter set), may consider inputs (e.g., a third parameter set) from other motion detection mechanisms to confirm a static (e.g., UE stationary) versus a non-static (e.g., UE non-stationary) condition of the UE prior to triggering measurement of the second parameter set. In some embodiments, measurement of the first parameter set may be associated with little or no power cost whereas measurement of the second parameter set may be associated with a higher power cost. In other words, measurement of the first parameter set may not increase power consumption for the UE whereas measurement of the second parameter set may increase power consumption for the UE.

Figure 5:
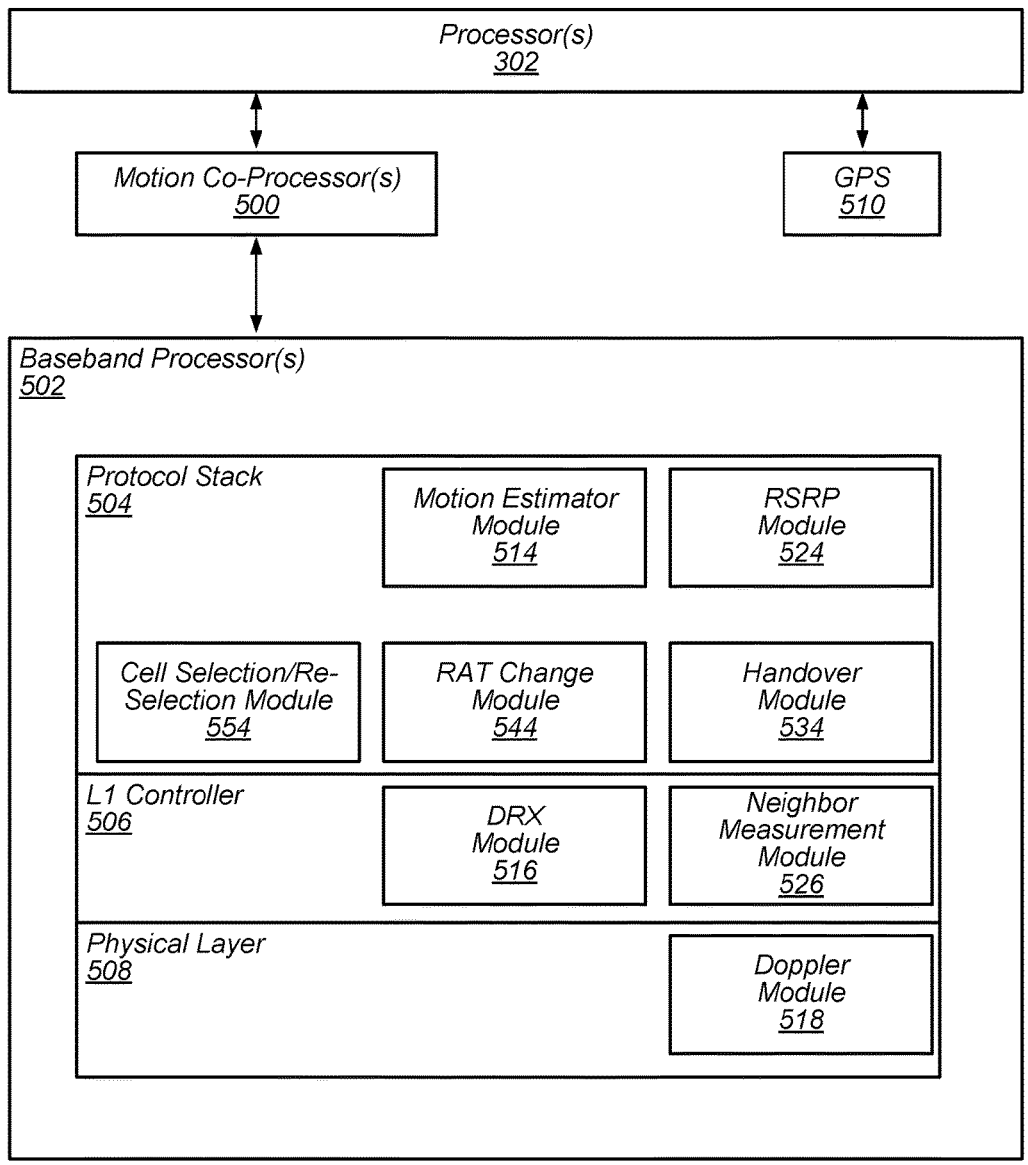
FIG. 5 illustrates an example system architecture of a UE configured to implement a motion estimation algorithm, according to some embodiments.

FIG. 5 illustrates an example system architecture of a UE configured to implement a motion estimation algorithm, according to some embodiments. The system architecture shown in FIG. 5 may be implemented on a UE such as UE 106/107 described above. As shown, processor(s) 302 may interface to a global positioning system 510 and a motion co-processor(s) 500. The motion co-processor(s) 500 may interface to one or more motion sensors (e.g., accelerometers, gyroscopes, and so forth) and may estimate movement of the UE. In addition, the motion co-processor(s) 500 may interface with processor(s) 302 as well as with a baseband processor(s) 502 of the UE. In some embodiments, the motion co-processor(s) 502 may interface with the baseband processor(s) 502 via a universal asynchronous receiver transmitter (UART) driver. In some embodiments, baseband processor(s) 502 may include various components and modules of the UE. For example, baseband processor(s) 502 may include a protocol stack 504, a layer one (L1) controller 506, and/or a physical layer 508.

As shown, a protocol stack 504 of baseband processor(s) 502 may include one or more sub-components or modules that provide various parameters for motion estimation. For example, the protocol stack 504 may include a motion estimator module 514, a reference signal received power (RSRP) module 524, a handover module 534, a RAT change module 544, and/or a cell selection/re-selection module 554. The one or more modules may provide various parameters for motion estimation based on respective time windows and/or on demand. In other words, a module may provide a respective parameter periodically based on the module's time reference. For example, the RSRP module 524 may provide an RSRP measurement every 1.28 seconds, however, other modules (e.g., handover module 534, RAT change module 544, and/or cell selection/re-selection module 554) may provide parameters more or less frequently as compared to the RSRP measurement.

As shown, a L1 controller 506 of baseband processor(s) 502 may include one or more sub-components or modules that provide various parameters for motion estimation. For example, the L1 controller 506 may include a discontinuous reception cycle (DRX) module 516 and a neighbor cell measurement module 526. The one or more modules may provide various parameters for motion estimation based on respective time windows and/or on demand. In other words, a module may provide a respective parameter periodically based on the module's time reference.

As shown, a physical layer 508 of baseband processor(s) 502 may include one or more sub-components or modules that provide various parameters for motion estimation. For example, the physical layer 508 may include a Doppler module 518. The one or more modules may provide various parameters for motion estimation based on respective time windows and/or on demand. In other words, a module may provide a respective parameter periodically based on the module's time reference.

As noted above, the modules providing parameters for motion estimation may not be time synchronized. In other words, parameters may be updated at differing frequencies. Thus, in some embodiments, motion estimator module 514 may determine a frequency for updating the motion estimation of the UE and may time sequence inputs from the modules providing parameters for the motion estimation such that the parameters for the motion estimation are sampled at a common time reference. In some embodiments, motion estimator module 514 may assume a previous value of a parameter if the parameter is not updated as frequently as the frequency for updating. In other words, the motion estimator module 514 may use a most recently available value for a parameter as input into a motion estimation algorithm.

Figure 6:
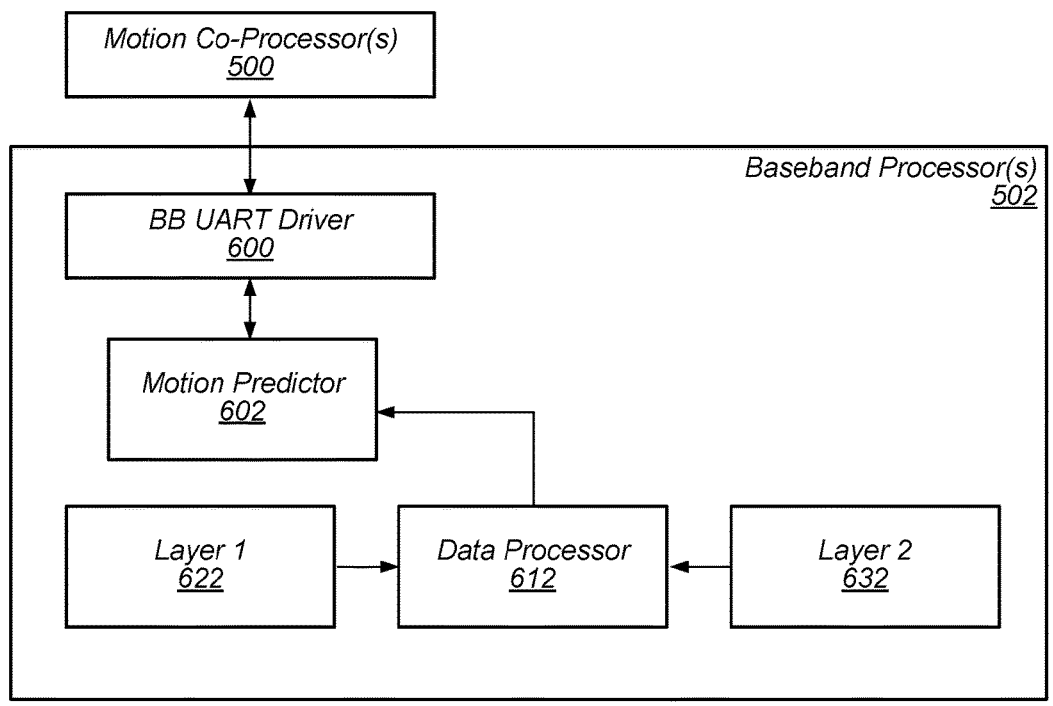
FIG. 6 illustrates an example architecture of a motion estimator, according to some embodiments.

FIG. 6 illustrates an example architecture of a motion estimator, according to some embodiments. Note that the motion estimator illustrated in FIG. 6 may be implemented on and/or be in communication with a baseband processor(s) of a UE, e.g., as illustrated above in reference to FIG. 5. As illustrated, baseband processor(s) 502 may include a baseband UART driver 600 which may transmit and receive data from motion co-processor(s) 500. Motion co-processor(s) 500 may provide motion data via one or more sensors such as accelerometers and/or gyroscopes located throughout the UE. Baseband UART driver 600 may also transmit and receive data from motion predictor 602. Motion predictor 602 may also receive inputs from data processor 612. Data processor 612 may receive data from both layer 1 622 and layer 2 632 of baseband processor(s) 502, e.g., as described above.

Figure 7:
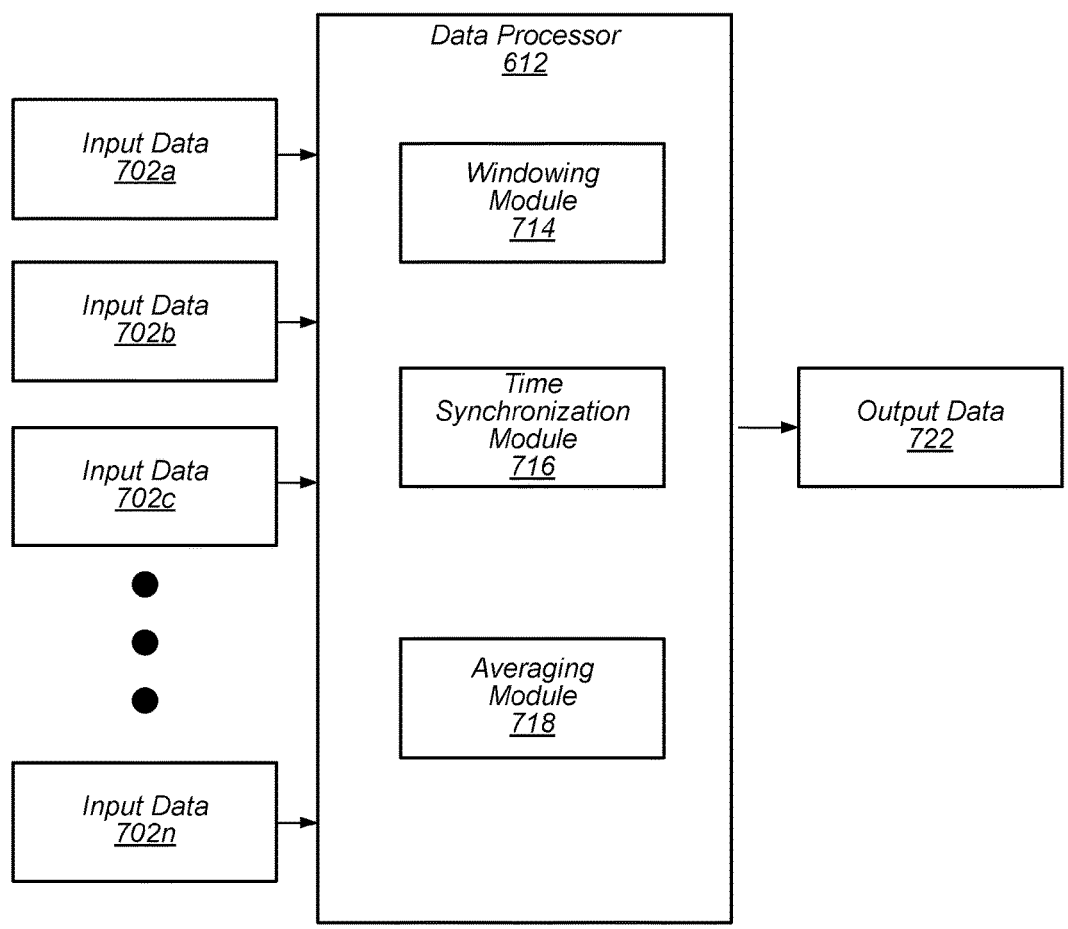
FIG. 7 illustrates an example block diagram of a data processor module, according to some embodiments.

FIG. 7 illustrates an example block diagram of a data processor module, according to some embodiments. As shown, data processor 612 may receive data from multiple data sources, e.g., such as input data 702*a-n*. The input data may be any of various cellular related parameters. For example, the input data may include any of time adjustment information, downlink and/or uplink frame timing offsets, random access channel (RACH) parameters related to cell size (e.g., preamble format, cyclic shift), signal strength parameters (e.g., reference signal received power (RSRP), reference signal received quality (RSRQ), signal to noise ratio (SNR), signal to noise plus interference ratio (SINR), received signal strength indicator (RSSI), and so forth), signal strength parameter deltas and/or time rates of change, cell change rate, number of unique (serving/neighbor) cells in a time window, number of new cells (serving/neighbor) in a time window, total number of cells (serving/neighbor) in a time window, rate of unique cells (serving/neighbor) per time window, rate of new cells (serving/neighbor) per time window, number of handovers in a time window, rate of change of handovers per time window, a number of cell selections in a time window, a number of cell reselections in a time window, Doppler measurements, and so forth. In some embodiments, data processor 612 may include one or more modules for averaging of the input data, e.g., averaging module 718. In some embodiments, an exponentially weighted moving window average may be applied to each input. In addition, a windowing module 714 may crop the input data for specified time periods/time windows. Further, a time synchronization module 716 may align input data arriving via differing time references.

In some embodiments, data processor 612 may output a vector of data assembled from the inputs, e.g., output data 722. In some embodiments, output data 722 may be based on a first parameter set. In some embodiments, output data 722 may be based on a first parameter set in combination with a second parameter set. In some embodiments, the first parameter set may include any of time adjustment information, downlink and/or uplink frame timing offsets, random access channel (RACH) parameters related to cell size (e.g., preamble format, cyclic shift), signal strength parameters (e.g., reference signal received power (RSRP), reference signal received quality (RSRQ), signal to noise ratio (SNR), signal to noise plus interference ratio (SINR), received signal strength indicator (RSSI), and so forth), signal strength parameter deltas and/or time rates of change, cell change rate, number of unique cells (serving/neighbor) in a time window, number of new cells (serving/neighbor) in a time window, total number of cells (serving/neighbor) in a time window, rate of unique cells (serving/neighbor) per time window, rate of new cells (serving/neighbor) per time window, number of handovers in a time window, rate of change of handovers per time window, a number of cell selections in a time window, and/or a number of cell reselections in a time window. In some embodiments, the second parameter set may include Doppler based measurements.

Figure 8:
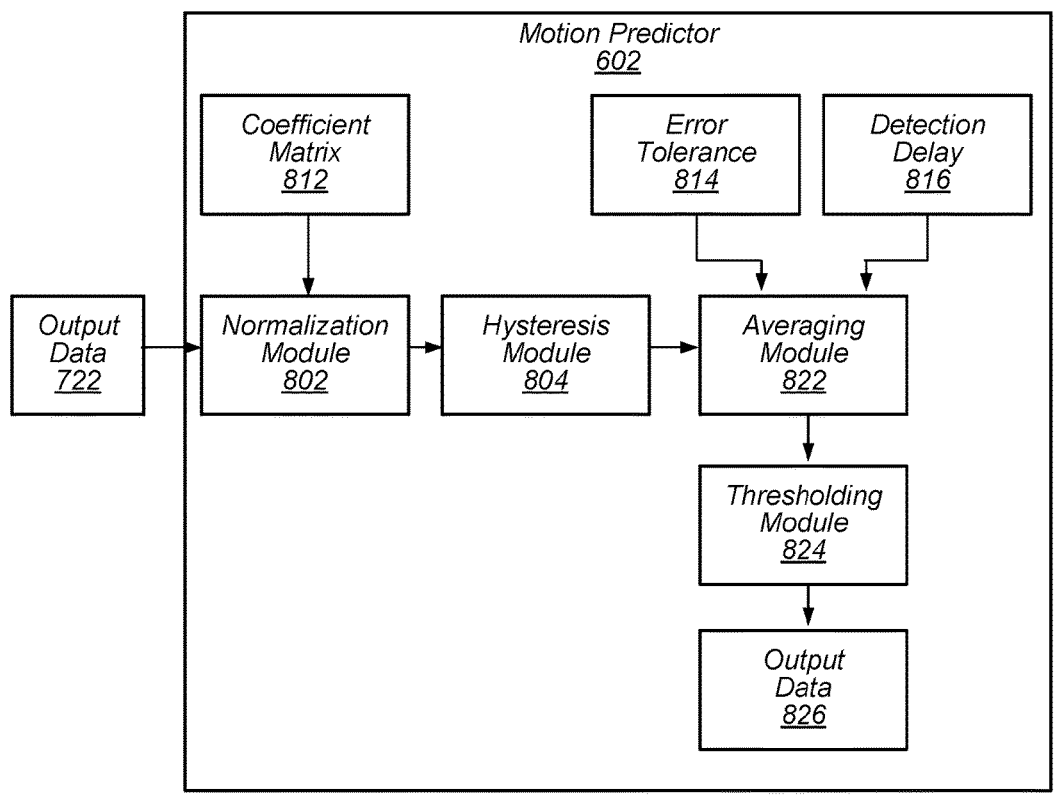
FIG. 8 illustrates an example block diagram of a motion predictor module, according to some embodiments.

FIG. 8 illustrates an example block diagram of a motion predictor module, according to some embodiments. As shown, motion predictor module 602 may include one or more sub-modules and may receive output data 722 from data processor 612. The output data 722 may be input into a normalization module 802. The normalization module 802 may normalize the output data 722 via application of coefficient matrix 812, thereby generating normalized data.

The normalized data may be passed to a hysteresis module 804. Hysteresis module 804 may improve confidence of the normalized data, e.g., via time averaging results to ensure threshold value has been obtained over a specified period of time. Data output from the hysteresis module 804 may be passed to averaging module 822. Averaging module 822 may also receive inputs from error tolerance module 814 and detection delay module 816. The inputs from error tolerance module 814 and detection delay module 816 may further enhance the velocity estimation, e.g., via application of tolerancing and time windowing to further ensure threshold value has been obtained over the specified period of time.

Data output from averaging module 822 may be passed to thresholding module 824. Thresholding module 824 may determine whether the velocity estimation has achieved a specified threshold. As noted above the threshold may be multi-dimensional. In some embodiments, the thresholding module 824 may output a boolean response, thereby generating output data 826. In other words, thresholding module 824 may determine whether a condition has obtained, e.g., whether the velocity estimation has exceeded the specified threshold.

As noted above, data output from the data processor module may be normalized via a coefficient matrix, e.g., coefficient matrix 812. In some embodiments, coefficient matrix 812 may be generated (calculated and/or determined) via a learning model. In some embodiments, the learning model may be fixed for all environments or the learning model may be optimized based on various environments such as urban, rural, low frequency operation, high frequency operation, state of the UE (e.g., idle versus connected mode), and so forth. In some embodiments, the learning model may be static, e.g., the learning model may be trained off-line (e.g., coefficients may be generated prior to implementation on a UE and thus pre-stored in a memory of the UE), or the learning model may be dynamic, e.g., the learning model may be trained on-line (e.g., coefficients may be generated and/or updated on-device during operation of the device).

Figure 9:
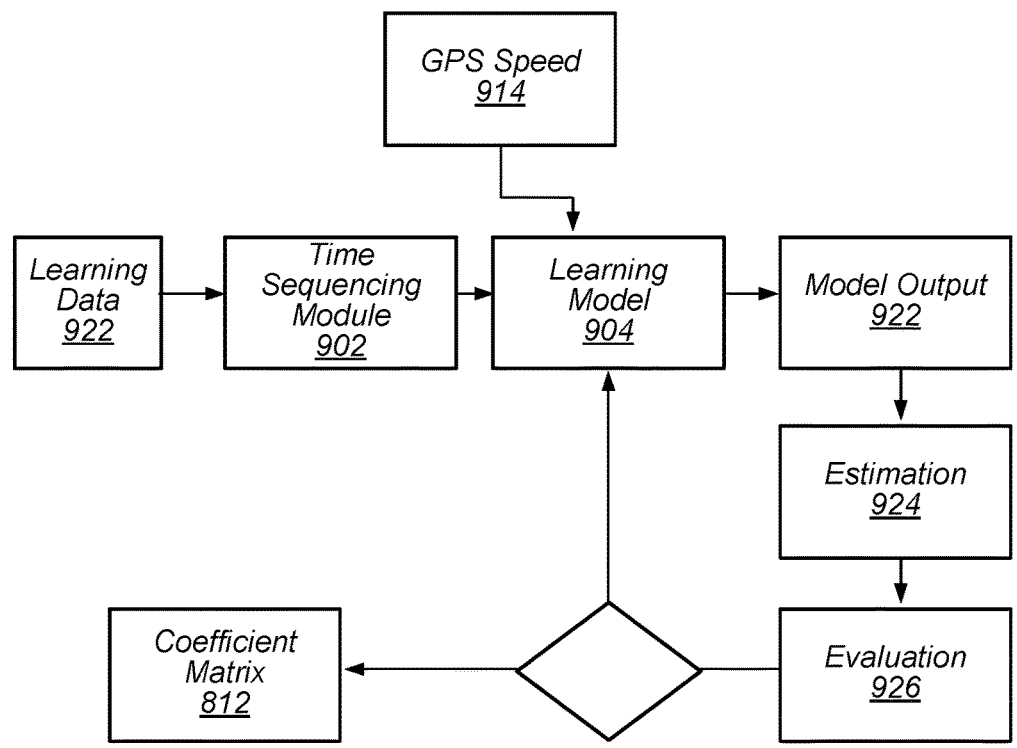
FIG. 9 illustrates an example block diagram of a learning model, according to some embodiments.

FIG. 9 illustrates an example block diagram of a learning model, according to embodiments. As noted above, in some embodiments, the learning model may be static or dynamic. In some embodiments, the learning model may be optimized based on environments. In some embodiments, the learning model may be implemented on a UE such as UE 106/107 described above. In some embodiments, the learning model may be implements on a baseband processor (e.g., baseband processor 502) of a UE.

As shown, learning data 922 may be input into a time sequencing module 902. In some embodiments, the learning data 922 may be provided by data processor 612. Time sequencing module 902 may sequence the learning data 922 such that the data is standardized to a common time reference, e.g., as described above. The time sequenced data may then be input into learning model 904 along with GPS speed 914. In some embodiments, learning model 904 may perform a linear regression of the time sequenced data using GPS speed 914 to calculate an initial coefficient matrix, e.g., model output 922. The model output 922 may be fed into an estimation module 924 which may implement a similar (or same) algorithm as implemented by motion predictor 602. The results from the estimation module 924 may then be evaluated for accuracy by evaluation module 926. Based on results of the evaluation, the coefficients may be adjusted and fed back into learning model 904 or the results may be satisfactory and the coefficients may be used to populate coefficient matrix 812.

Figure 10:
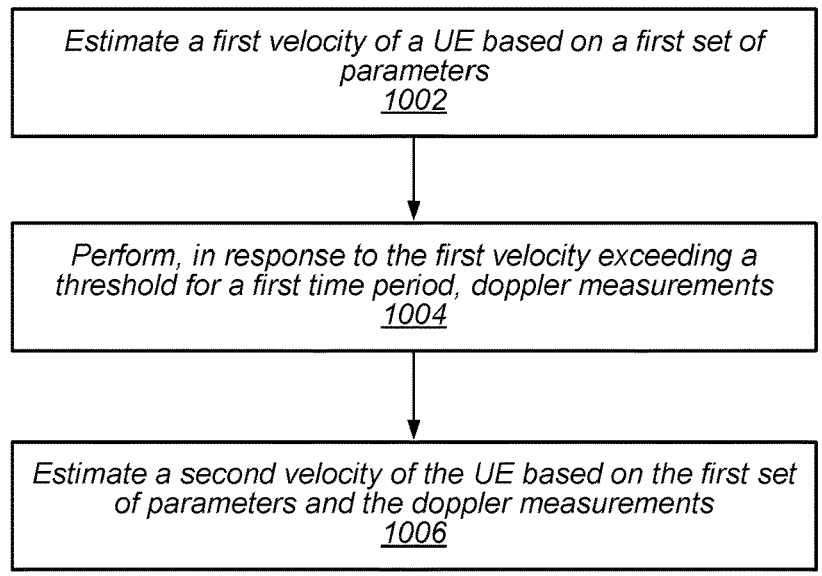
FIG. 10 illustrates a block diagram of an example of a method for estimating UE motion based on cellular parameters, according to some embodiments.

FIG. 10 illustrates a block diagram of an example of a method for estimating UE motion based on cellular parameters, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a first velocity of a UE may be estimated. The estimate may be based on a first set of parameters. The first set of parameters may be associated with one or more cellular based metrics. For example, the cellular based metrics may include any of (or any combination of) time adjustment information, downlink and/or uplink frame timing offsets, random access channel (RACH) parameters related to cell size (e.g., preamble format, cyclic shift), signal strength parameters (e.g., reference signal received power (RSRP), reference signal received quality (RSRQ), signal to noise ratio (SNR), signal to noise plus interference ratio (SINR), received signal strength indicator (RSSI), and so forth), signal strength parameter deltas and/or time rates of change, cell change rate, number of unique (serving/neighbor) cells in a time window, number of new cells (serving/neighbor) in a time window, total number of cells (serving/neighbor) in a time window, rate of unique cells (serving/neighbor) per time window, rate of new cells (serving/neighbor) per time window, number of handovers in a time window, rate of change of handovers per time window, a number of cell selections in a time window, and/or a number of cell reselections in a time window. In some embodiments, one or more of the cellular based metrics may be normalized to a common time reference. In some embodiments, an exponentially weighted moving average may be applied to each of the one or more cellular based metrics.

At 1004, Doppler measurements may be performed. In some embodiments, performing (or conducting) the Doppler measurements may be triggered by the first velocity exceeding a velocity threshold (e.g., 10 mph, 15 mph, 20 mph, 25 mph, 30 mph, 45 mph, and so forth) for at least a time period (e.g., 10 seconds, 15 seconds, 30 seconds, 45 seconds, and so forth). In some embodiments, performing (or conducting) the Doppler measurements may be triggered by the first velocity exceeding the velocity threshold for at least the first time period and receiving an indication from a motion processor of the UE that the UE is in a non-static state. Note that in such embodiments, if the motion processor of the UE indicates that the UE is in a static state, the Doppler measurements may not be performed.

At 1006, a second velocity of the UE may be estimated based on the first set of parameters and the Doppler measurements.

In some embodiments, the second velocity may be compared to the velocity threshold to determine if the second velocity exceeds the velocity threshold for at least the time period. In addition, if the second velocity exceeds the velocity threshold for at least the time period, an application processor(s) or the motion co-processor of the UE may be notified that the UE is moving at a velocity greater than the velocity threshold.

In some embodiments, to estimate the velocity (e.g., the first and/or second velocity), data (e.g., the first set of parameters and/or the Doppler measurements) may be normalized via a coefficient matrix derived from a learning model (e.g., as described above). In some embodiments, the learning model may be adjustable based on environment (e.g., rural, urban, low frequency operation, and/or high frequency operation) and/or UE mode (e.g., connected and/or idle).

Figure 11:
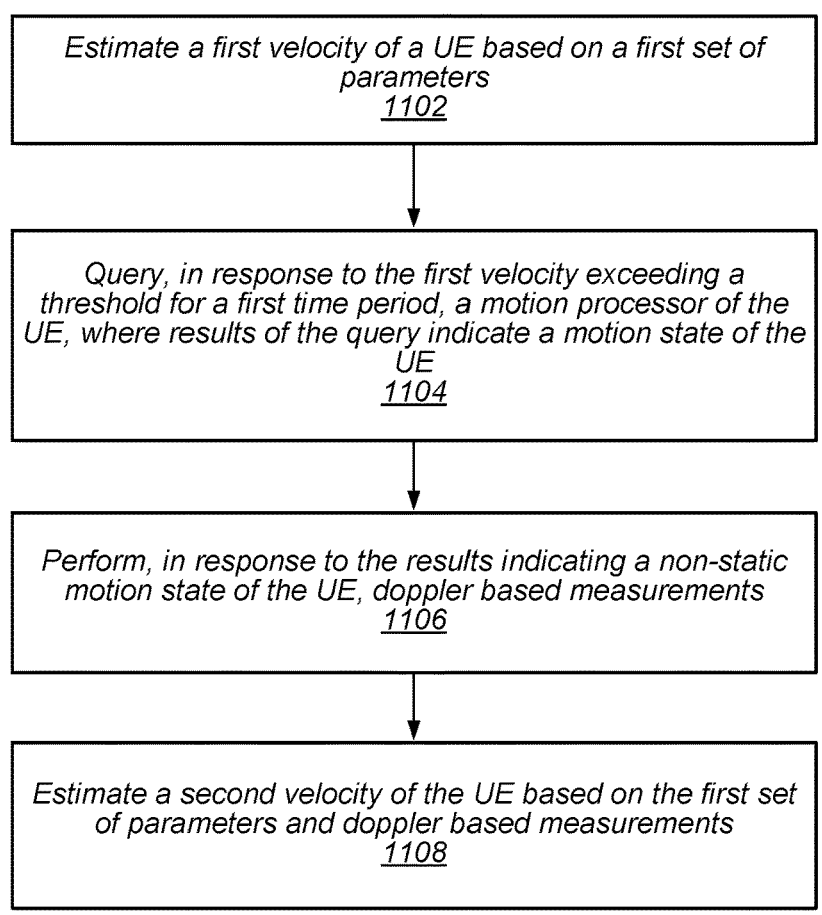
FIG. 11 illustrates a block diagram of an example of another method for estimating UE motion based on cellular parameters, according to some embodiments.

FIG. 11 illustrates a block diagram of an example of another method for estimating UE motion based on cellular parameters, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a first velocity of a UE may be estimated. The estimate may be based on a first set of parameters. The first set of parameters may be associated with one or more cellular based metrics. For example, the cellular based metrics may include any of (or any combination of) time adjustment information, downlink and/or uplink frame timing offsets, random access channel (RACH) parameters related to cell size (e.g., preamble format, cyclic shift), signal strength parameters (e.g., reference signal received power (RSRP), reference signal received quality (RSRQ), signal to noise ratio (SNR), signal to noise plus interference ratio (SINR), received signal strength indicator (RSSI), and so forth), signal strength parameter deltas and/or time rates of change, cell change rate, number of unique cells (serving/neighbor) in a time window, number of new cells (serving/neighbor) in a time window, total number of cells (serving/neighbor) in a time window, rate of unique cells (serving/neighbor) per time window, rate of new cells (serving/neighbor) per time window, number of handovers in a time window, rate of change of handovers per time window, a number of cell selections in a time window, and/or a number of cell reselections in a time window. In some embodiments, one or more of the cellular based metrics may be normalized to a common time reference. In some embodiments, an exponentially weighted moving average may be applied to each of the one or more cellular based metrics.

At 1104, a motion processor of the UE may be queried to determine whether the UE is in a static or non-static state. In other words, results of the query may indicate whether the UE is moving (non-static) or stationary (static). In some embodiments, the query may be triggered by the first velocity exceeding a velocity threshold (e.g., 10 mph, 15 mph, 20 mph, 25 mph, 30 mph, 45 mph, and so forth) for at least a time period (e.g., 10 seconds, 15 seconds, 30 seconds, 45 seconds, and so forth).

At 1106, Doppler measurements may be performed. In some embodiments, performing (or conducting) the Doppler measurements may be triggered by the first velocity exceeding the velocity threshold for at least the first time period and receiving an indication from a motion processor of the UE that the UE is in a non-static state. Note that in such embodiments, if the motion processor of the UE indicates that the UE is in a static state, the Doppler measurements may not be performed.

At 1108, a second velocity of the UE may be estimated based on the first set of parameters and the Doppler measurements. In some embodiments, the second velocity may be compared to the velocity threshold to determine if the second velocity exceeds the velocity threshold for at least the time period. In addition, if the second velocity exceeds the velocity threshold for at least the time period, an application processor(s) of the UE may be notified that the UE is moving at a velocity greater than the velocity threshold.

In some embodiments, to estimate the velocity (e.g., the first and/or second velocity), data (e.g., the first set of parameters and/or the Doppler measurements) may be normalized via a coefficient matrix derived from a learning model (e.g., as described above). In some embodiments, the learning model may be adjustable based on environment (e.g., rural, urban, low frequency operation, and/or high frequency operation) and/or UE mode (e.g., connected and/or idle).

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user electronics device (UE), comprising:
   at least one antenna for performing wireless communication;
   at least one radio coupled to the at least one antenna, wherein the at least one radio is configured to perform cellular communication with a base station;
   one or more processors coupled to the at least one radio, wherein the one or more processors and the at least one radio are configured to perform wireless communications using the at least one antenna;
   wherein the one or more processors are configured to cause a UE to:
      derive a coefficient matrix via a learning model, wherein the one or more processors are further configured to:
         provide a first set of parameters to the learning model, wherein the first set of parameters are associated with one or more cellular communication based metrics;
         estimate a velocity of the UE based on the learning model;
         evaluate the estimated velocity based on a global positioning system velocity of the UE;
         adjust values of the coefficient matrix based on the evaluation;
         re-estimate the velocity using the provided first set of parameters and the adjusted values of the coefficient matrix; and
      normalize the first set of parameters via the adjusted coefficient matrix; and
      estimate a first velocity of the UE based on the normalized first set of parameters.

2. The UE of claim 1,
   wherein a first cellular communication based metric of the one or more cellular communication based metrics has a different time base than a second cellular communication metric of the one or more cellular communication based metrics;
   wherein, to estimate the first velocity, the one or more processors are further configured to cause the UE to normalize the first and second cellular communications metrics to a common time reference.

3. The UE of claim 1,
wherein, to estimate the first velocity, the one or more processors are further configured to cause the UE to:
receive, at a specified frequency, the one or more cellular communication based metrics from one or more layers of a protocol stack implemented on the UE; and
apply an exponentially weighted moving average to each cellular communication metric of the one or more communication metrics.

4. The UE of claim 1,
wherein the first set of parameters comprise at least one of:
time adjustment information;
downlink frame timing offset;
uplink frame timing offset;
random access channel (RACH) parameters related to cell size;
reference signal received power (RSRP) delta;
reference signal received quality (RSRQ) delta;
signal to noise ratio (SNR) delta;
signal to noise plus interference ratio (SINR) delta;
received signal strength indicator (RSSI) delta;
reference signal received power (RSRP) rate of change;
reference signal received quality (RSRQ) rate of change;
signal to noise ratio (SNR) rate of change;
signal to noise plus interference ratio (SINR) rate of change;
received signal strength indicator (RSSI) rate of change;
cell change rate;
a number of unique cells in a time window;
a number of new cells in a time window;
a total number of cells in a time window;
rate of unique cells per time window;
rate of new cells per time window;
a number of handovers in a time window;
a rate of change of handovers per time window;
a number of cell selections in a time window; or
a number of cell reselections in a time window.

5. The UE of claim 1,
wherein the learning model is adjustable based on an environment of the UE and a mode of the UE.

6. The UE of claim 1,
wherein the one or more processors are further configured to cause the UE to:
perform, in response to at least determining that the first velocity has exceeded a threshold velocity for at least a first period of time, one or more Doppler based measurements; and
estimate a second velocity of the UE based on the first set of parameters and the one or more Doppler based measurements.

7. The UE of claim 6,
wherein the one or more processors are further configured to cause the UE to:
compare the second velocity to the threshold velocity; and
notify, in response to the second velocity exceeding the threshold velocity for at least the first time period, one or more processors of the UE, that the UE is moving at a velocity greater than the threshold velocity.

8. The UE of claim 6,
wherein the one or more processors are further configured to cause the UE to query a motion processor of the UE, wherein results of the query indicate a motion state of the UE;
wherein, in response to the results indicating a static motion state of the UE, the one or more processors are further configured to cause the UE to not estimate the second velocity.

9. The UE of claim 8,
wherein the one or more processors are further configured to cause the UE to estimate the second velocity in response to the results indicating a non-static motion state of the UE and the first velocity exceeding the velocity threshold for at least the first time period.

10. An apparatus, comprising:
a memory; and
at least one processor in communication with the memory, wherein the at least one processor is configured to:
derive a coefficient matrix via a learning model, wherein the at least one processor is further configured to:
provide a first set of parameters to the learning model, wherein the first set of parameters are associated with one or more cellular communication based metrics;
estimate a velocity of a wireless device associated with the apparatus based on the learning model;
evaluate the estimated velocity based on a global positioning system velocity of the wireless device;
adjust values of the coefficient matrix based on the evaluation;
re-estimate the velocity using the provided first set of parameters and the adjusted values of the coefficient matrix; and
normalize the first set of parameters via the adjusted coefficient matrix; and
estimate a first velocity of a wireless device based the normalized first set of parameters.

11. The apparatus of claim 10,
wherein the first set of parameters comprise at least one of:
time adjustment information;
downlink frame timing offset;
uplink frame timing offset;
random access channel (RACH) parameters related to cell size;
reference signal received power (RSRP) delta;
reference signal received quality (RSRQ) delta;
signal to noise ratio (SNR) delta;
signal to noise plus interference ratio (SINR) delta;
received signal strength indicator (RSSI) delta;
reference signal received power (RSRP) rate of change;
reference signal received quality (RSRQ) rate of change;
signal to noise ratio (SNR) rate of change;
signal to noise plus interference ratio (SINR) rate of change;
received signal strength indicator (RSSI) rate of change;
cell change rate;
a number of unique cells in a time window;
a number of new cells in a time window;
a total number of cells in a time window;
rate of unique cells per time window;
rate of new cells per time window;
a number of handovers in a time window;
a rate of change of handovers per time window;

a number of cell selections in a time window; or
a number of cell reselections in a time window.

12. The apparatus of claim 10,
wherein the at least one processor is further configured to:
perform, in response to one or more conditions obtaining, Doppler based measurements; and
estimate a second velocity of the wireless device based on the first set of parameters and the Doppler based measurements.

13. The apparatus of claim 12,
wherein the one or more conditions comprise at least one of:
a velocity threshold exceeded for a first time period; or
an indication that the wireless device is in a non-static state.

14. The apparatus of claim 12,
wherein the at least one processor is further configured to:
compare the second velocity to a threshold velocity; and
notify, in response to the second velocity exceeding the threshold velocity for at least a first time period, one or more processors of the wireless device that the wireless device is moving at a velocity greater than the threshold velocity.

15. The apparatus of claim 10,
wherein a first cellular communication based metric of the one or more cellular communication based metrics has a different time base than a second cellular communication metric of the one or more cellular communication based metrics;
wherein, to estimate the first velocity, the at least one processor is further configured to normalize the first and second cellular communications metrics to a common time reference.

16. A non-transitory computer-readable memory medium that stores program instructions that, when executed by a wireless user equipment device (UE), cause the UE to:
derive a coefficient matrix via a learning model, wherein the program instructions are further executable to:
provide a first set of parameters to the learning model, wherein the first set of parameters are associated with one or more cellular communication based metrics;
estimate a velocity of the UE based on the learning model;
evaluate the estimated velocity based on a global positioning system velocity of the UE;
adjust values of the coefficient matrix based on the evaluation;
re-estimate the velocity using the provided first set of parameters and the adjusted values of the coefficient matrix; and
normalize the first set of parameters via the adjusted coefficient matrix; and
estimate a first velocity of the UE, wherein the first velocity is based on the normalized first set of parameters.

17. The non-transitory computer-readable memory medium of claim 16,
wherein a first parameter of the first set of parameters has a different time base than a second parameter of the first set of parameters;
wherein, to estimate the first velocity, the program instructions are further executable to normalize the first and second parameters to a common time reference.

18. The non-transitory computer-readable memory medium of claim 16,
wherein the program instructions are further executable to:
query, in response to determining that the first velocity has exceeded a first threshold for at least a first time period, a motion processor of the UE, wherein results of the query indicate a motion state of the UE;
perform, in response to the results indicating a non-static motion state of the UE, one or more Doppler based measurements; and
estimate a second velocity of the UE based on the first set of parameters and the one or more Doppler based measurements.

19. The non-transitory computer-readable memory medium of claim 18,
wherein the program instructions are further executable to:
compare the second velocity to the first threshold; and
notify, in response to the second velocity exceeding the first threshold for at least the first time period, one or more application processors of the UE that the UE is moving at a velocity greater than the threshold velocity.

20. The non-transitory computer-readable memory medium of claim 16,
wherein, to estimate the first velocity, the program instructions are further executable to:
receive, at a specified frequency, the one or more cellular communication based metrics from one or more layers of a protocol stack implemented on the UE; and
apply an exponentially weighted moving average to each cellular communication metric of the one or more communication metrics.

* * * * *